United States Patent [19]
Ryan, III

[11] Patent Number: 5,666,737
[45] Date of Patent: Sep. 16, 1997

[54] TEMPLATE FOR EUROPEAN STYLE CABINETRY

[76] Inventor: James C. Ryan, III, 182 Cobbs Hill Dr., Rochester, N.Y. 14610

[21] Appl. No.: 574,847

[22] Filed: Dec. 19, 1995

[51] Int. Cl.⁶ ................................................ G01B 3/10
[52] U.S. Cl. ...................... 33/562; 33/494; 33/758; 33/759; 33/679.1
[58] Field of Search ............................ 33/562, 483, 494, 33/755, 758, 759, 194, 197, 679.1

[56] References Cited

U.S. PATENT DOCUMENTS

| | | |
|---|---|---|
| 2,187,087 | 12/1940 | Leary . |
| 2,507,684 | 5/1950 | Smith . |
| 2,932,897 | 4/1960 | Huber ................................. 33/758 |
| 3,621,579 | 11/1971 | Dubitsky . |
| 3,664,026 | 5/1972 | Lawson ............................... 33/759 |
| 3,936,944 | 2/1976 | Byne ................................... 33/758 |
| 4,149,320 | 4/1979 | Troyer et al. . |
| 4,351,113 | 9/1982 | Eggertsen et al. . |
| 4,367,590 | 1/1983 | Winter et al. . |
| 4,425,391 | 1/1984 | Wilson . |
| 4,708,755 | 11/1987 | Lambelet . |
| 4,750,270 | 6/1988 | Kundikoff ........................... 33/755 |
| 4,827,621 | 5/1989 | Borsuk . |
| 4,845,858 | 7/1989 | Thomas . |
| 4,942,670 | 7/1990 | Brandt . |
| 4,965,943 | 10/1990 | Adams . |
| 4,970,797 | 11/1990 | Sarasin . |
| 5,012,590 | 5/1991 | Wagner et al. .................... 33/759 |
| 5,107,601 | 4/1992 | Semchuck . |
| 5,255,207 | 10/1993 | Cornwell . |

*Primary Examiner*—Christopher W. Fulton
*Attorney, Agent, or Firm*—Cumpston & Shaw

[57] ABSTRACT

The present invention relates to a flexible, adhesive backed, transparent template tape which includes specific metric dimensions to assist in the construction of European style cabinetry. The template tape is dimensionally accurate and can be used for accurate layout using measuring indicia along both axes simultaneously.

30 Claims, 2 Drawing Sheets

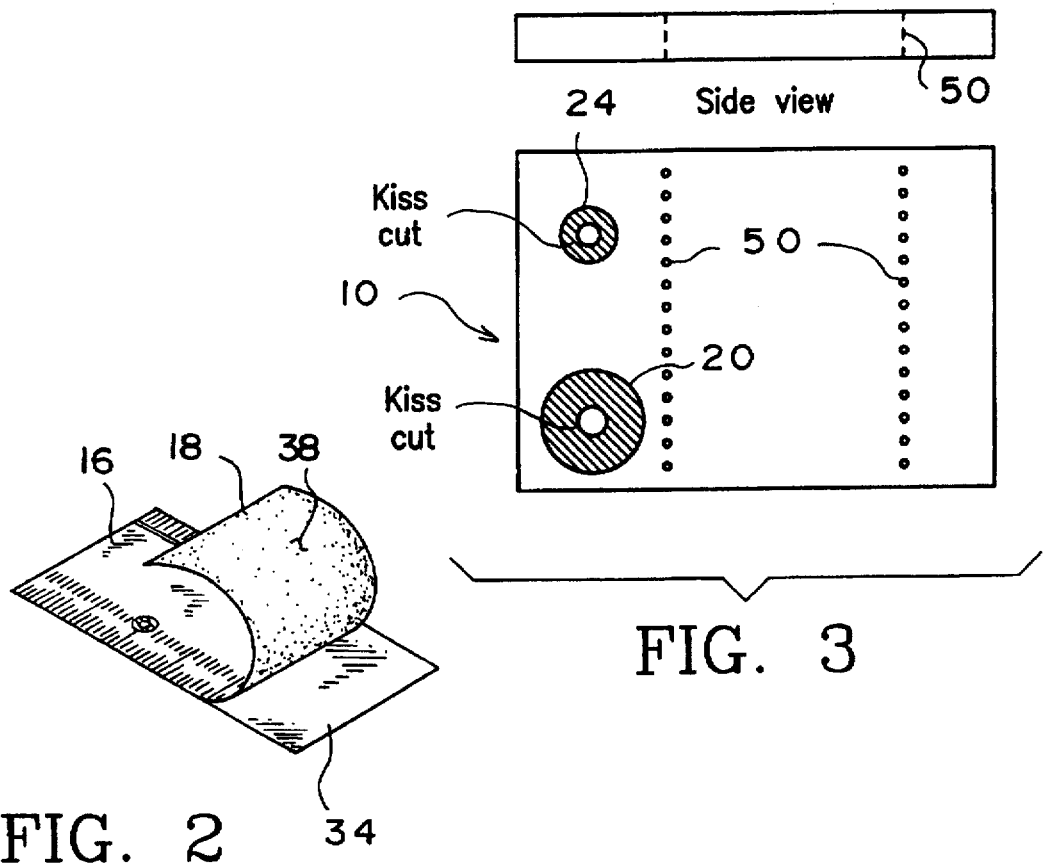
FIG. 2
FIG. 3
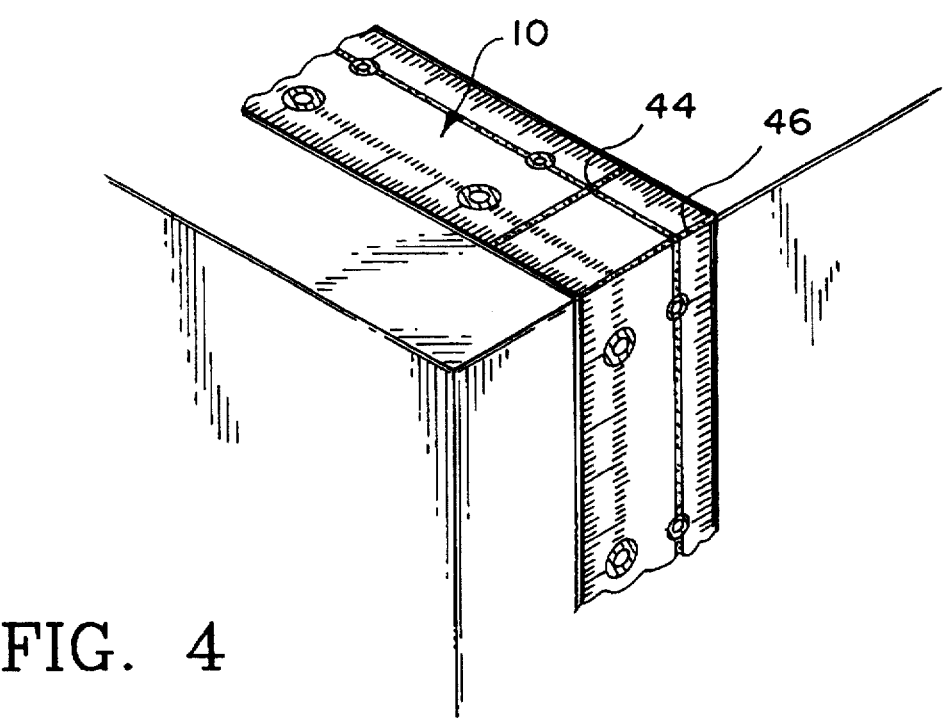
FIG. 4

TEMPLATE FOR EUROPEAN STYLE CABINETRY

FIELD OF INVENTION

This invention relates to a measuring device and more particularly to a template system which is particularly adapted for application in the construction of European style cabinetry.

1. Background of the Invention

The prior art has long recognized that flexible measuring tapes, such as canvas measuring tapes or flexible metal measuring tapes, may be advantageously employed in a plethora of common applications. However, the necessity of holding these devices stationary in order to obtain a true measurement Often renders their use awkward, particularly where no assistance is available and large distances must be measured. Moreover; the use of these devices entails a manual measurement operation, which can be very time consuming and a significant source of costly errors, particularly in construction applications, where a large number of measurements must be made over long distances. Such layout procedures involve reading-off and measuring from graduated and numerically marked measuring devices and almost invariably involve dimensions that must be applied cumulatively. Reading or arithmetic mistakes are easily made, and such errors are likely to have rather grave consequences, since these errors are cumulative. Accordingly, the deficiencies associated with these devices render their use for many operations, such as construction applications, undesirable.

The prior art has disclosed many template measuring devices which attempt to alleviate the aforementioned difficulties, albeit with inadequate success. Layout, supervision, and inspection by appropriately skilled persons have been costly alternatives. Appropriate specialized alphanumerically marked graduations and markings on measuring tapes and rulers have also been applied, yet this has often caused confusion and errors due to the need to discern specific readings among a plurality of markings and among measuring scale gradations. Furthermore, as design information is customarily provided on building construction plans in terms of center distances for construction members, establishment of spacings between such members offers additional opportunities for errors to occur.

Furthermore, most of these devices involve standard measuring tapes whereby only linear indicia are placed on the tape. The need still exists for a tape having an adhesive backing which is flexible to be manipulated around comers and board thicknesses, and which also has markings and specific graphic dimensions in both X and Y directions of the tape. Most tapes rely on utilizing their measuring indicia only along their length. The need exists for a tape which is dimensionally accurate and can be used for accurate layout using measuring indicia along both axes simultaneously.

2. Summary of Invention

It is therefore, an object of the present invention to provide a new and improved measuring device which eliminates the necessity for manual measurements, is easily usable by a single workman, and does not require the use of an additional measuring device therewith.

A flexible measuring template for marking the locations of holes to be drilled in first and second non coplanar surfaces of an object, comprising a first indicia adapted to be placed in registration with a line of intersection of the first and second surfaces; a second series of indicia uniformly spaced apart by a first distance extending from the first indicia in a first direction; a third set of indicia spaced a predetermined second distance from the first indicia in a second direction opposite from the first direction, the second distance being different than the first distance; and first and second edges.

BRIEF DESCRIPTION OF THE DRAWING

FIG. 2 illustrates a side view of the template being removed from the backing;

FIG. 3 illustrates a perforated kiss cut diameter; and

FIG. 4 illustrates the flexible adhesive tape being applied to a 90° angle.

DETAILED DESCRIPTION OF THE PREFERRED EMBODIMENT

Figure 1:
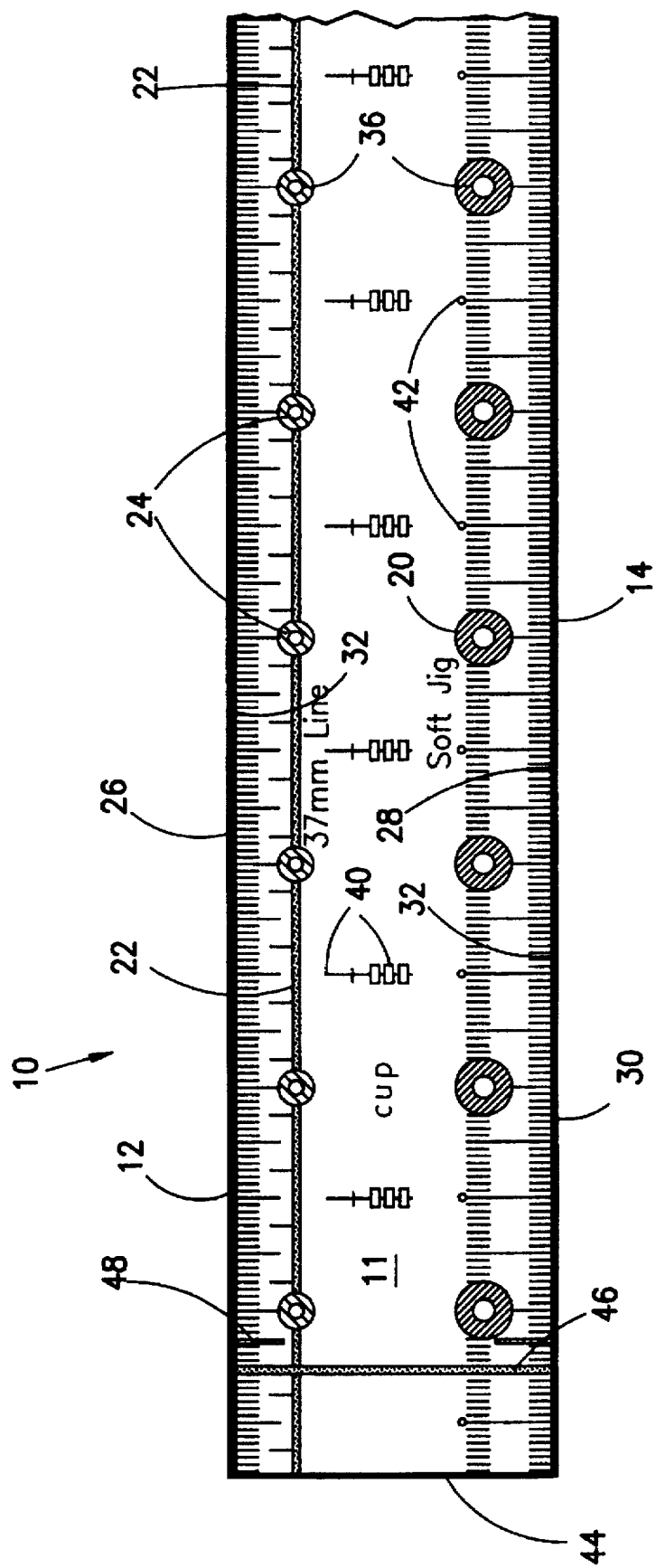
FIG. 1 illustrates a template according to the present invention.

The present invention provides a measuring device and a method for its use which is particularly adapted for use with European style hardware and construction of European style cabinetry. The present invention comprises a template tape which includes indicia which includes desired spacing of structural members without the necessity for manual measurement. The template tape is highly useful for performing error-free measurements in the construction of European style cabinetry, and is a template tape to form measurements of fixed length without the necessity of manual effort.

The present invention comprises a flexible, manageable, adhesive backed template tape which allows for the visualization and proper dimensional referencing and indexing for the accurate alignment and drilling for a specific variety of hardware commonly referred to as European Hardware, including but not limited to, European drawer slides, European concealed hinges, cam lock bolt fittings, ready-to-assemble (RTA) and hock-down (KD) fittings, dowels, universal brackets, shelf pins, decorative pulls and handles, and European accessories and baskets. The flexible tape is preferably transparent and is to be used directly on the work surface and the whole width and length serve as a usable guide for measurements. The tape 10, preferably having a millimeter scale along the length of the tape, may be used on first and second coplanar and/or noncoplanar surfaces. The tape 10 includes indicia markings which are positioned such that both the longitudinal and transverse axes may be utilized.

The present invention is not just a template to transfer measurements onto the work surface, it is a usable tape guide. That is, an individual does not have to use the edge solely, as one might use a standard wooden role. Referring to FIGS. 1 and 2, the measuring template tape 10 comprises a web 11 having first and second edges 12, 14 and obverse and reverse surfaces 16, 18. A plurality of measuring indicia, preferably spaced on a metric scale, are located on the obverse surface 16 on the web 11. The plurality of measuring indicia includes a first set of indicia 20, having a 32 mm spacing of circular holes along the longitudinal axis and a repeat pattern of 32 mm along the length of the tape 10. A second set of indicia 24, having a 32 mm spacing of circular holes along the longitudinal axis, is positioned along an opposite edge of the tape 10. A third set of indicia 42 is spaced a predetermined second distance from the first indicia 20 in a second direction opposite from the first direction, the second distance being different than the first distance.

A distinct graphic 22 is preferably positioned exactly 37 mm from the edge of the tape 10 or other reference line along the longitudinal axis of the tape 10. A 37 mm distance is a specific dimension for European hardware. The distinct graphic 22, preferably a solid line running longitudinally, runs on-center of either or both hole lines 20, 24 which are spaced 32 mm apart in a longitudinal direction. The tape 10 comprises two edge lines 26, 28 along the first and second edges 12, 14, the edge lines 26, 28 being 1.5 mm wide so that the distance to the center of the holes 20, 24 along the longitudinal axis is a first precise distance, preferably 9.5 mm, from an outside edge 30 and a second precise distance, preferably 8 mm, from an inside edge 32 of the edge lines 26, 28. The centers of the holes 20, 24 are 9.5 mm, one-half of a common board thickness, from their closest edge and 37 mm from their farthest edge. The 32 mm spaced markings are represented with circle graphics of 5 mm and 8 mm diameters, 24 and 20 respectively, to represent the eventual void in the tape 10 and work surface created by a respective drill bit.

The tape 10 also includes a removable backing 34 so that a simple transfer of a few location marks can be achieved without peeling the backing 34 off the whole tape 10, thus allowing an individual piece of the tape 10 to be reused. (see FIGS. 2 and 3). The backing 34 is preferably comprised of paper, plastic, wax paper, or any suitable material. Preferably, the center diameters 36 of the circle graphics 20, 24 are to be "kiss-cut" so that the center diameters 36 of the 8 mm and 5 mm hole graphics 20, 24 are cut out so that when the tape 10 is peeled off the backing 34 the center diameter graphics 36 remain on the backing 34. The tape 10 further comprises an adhesive substrate 38 on its obverse surface 18 such that the tape 10 may be affixed to a work surface and will remain on a work surface for a desired period of time.

Further, as illustrated by FIG. 1, the tape comprises multiple centerpoint indicia 40 located at 17.5 mm from one edge of the tape and indexed to repeat it on 2 mm increments. The multiple centerpoints 40, arranged laterally on the obverse surface, enable an individual to locate and drill for European 35 mm cup hinges. This measurement allows for the accurate alignment of the door drilling holes to cabinet member drilling holes. Additionally, the tape 10 includes center marks 42 which are spaced at 32 mm intervals and are located exactly 34 mm from an edge for the purpose of locating and drilling holes for European cam lock bolt RTA fittings.

The tape 10 further includes a first indicia bar 44 and a second indicia bar 46 or vertical start lines, preferably shaded vertical bars, 1.5 mm in width, that allow for the accurate positioning of the tape even after the cabinet is fully assembled. The first indicia bar 44 traverses the width of the tape 10 at a first precise distance, preferably 22.5 mm, from a first indicia, preferably the circular hole indicium, 20 or 24, in one direction and having a second periodic spacing which is an exact multiple of the periodic spacing of the first set of indicia. The second indicia bar 46, preferably having a width of 1.5 mm traverses the width of the tape 10 at a precise distance, preferably 22.5 mm, from a second circular indicium 20, 24 in an opposite direction. The second indicia bar 46 is positioned such that a repeat indicia of a multiple of 32 mm results in order to position the tape 10 on a second portion of the work surface orthogonal to the first portion. The distance between the first indicium and the second indicium is the first periodic spacing, which is preferably 13 mm. The indicia bars 44, 46 are a necessary element for refacing and post assembly jobs. The indicia bars 44, 46 or vertical start lines, allow the tape to be flexibly folded over an edge of the work piece at a 90 degree angle, thus allowing the tape to be used in both X and Y planes. Further, the template tape 10 comprises a pair of opposing indicia alignment marks 48, whereby each mark is located at a second precise distance, preferably 5 mm, from one of the circular indicia 20, 24 and projects at right angles from the first and second edges 12, 14. The indicia alignment marks 48 allow an individual to correctly align the template tape 10 on a work surface.

The tape 10 has a preferable width dimension of 46.5 mm, thus allowing for a 37 mm distance from a first edge 12 of the tape 10 to an opposite hole center 36 and then another 9.5 mm to the second edge 14 of the tape 10. Preferably, the tape 10 is manufactured in the form of a roll of a convenient size, and is adapted to be adhesively secured to a suitable base member which is to be measured. By employing a pressure sensitive adhesive tape, ease of use of the present invention is greatly improved over that obtained with prior art measuring devices. With the use of the present measuring tape, a single man can perform the measuring operation, without the need for assistant or extraneous fastenings to secure the tape to a work surface.

The tape may be constructed of any suitable material, such as: polyester, such as polyethylene terephthalate (e.g., mylar), polyolefins such as polyethylene and polypropylene, cellulose acetate, polyvinylidene fluoride, polypropylene copolymers, polyvinylchloride, nylon, reinforced plastics, e.g., nylon filament reinforced plastics, metal foil, low-stretch papers, and other well known equivalents. Preferably, the tape will not expand or contract, thereby preserving the correct dimensions of the indicia printed thereon. Further, the tape 10 may include perforations 50 along its transverse axis to allow the easy separation of desired lengths of tape. (As shown in FIG. 3).

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A flexible, measuring template tape for marking the locations of holes to be drilled in first and second non coplanar surfaces of an object having first and second edges and obverse and reverse surfaces, comprising:
    a first indicia adapted to be placed in registration with a line of intersection of the first and second surfaces;
    a second series of indicia uniformly spaced apart by a first distance extending from the first indicia in a first direction; and
    a third set of indicia spaced a predetermined second distance from the first indicia in a second direction opposite from the first direction, the second distance being different than the first distance.

2. The template as defined in claim 1 further comprising a plurality of the first indicia spaced apart by a third distance longer than the first and second distances.

3. The template as defined in claim 1 whereby the first indicia are circular.

4. The template as defined in claim 1 whereby the first indicia comprise a first set of repeating circular indicia having a diameter of 8 mm arranged longitudinally at a distance of 37 mm from the first edge of the tape to the center of the 8 mm circle and with a repeat of 32 mm.

5. The template as defined in claim 1 whereby the second series of indicia comprise a second set of repeating circular indicia having a diameter of 5 mm arranged longitudinally at a distance of 37 mm from the second edge of the tape to the center of the 5 mm circle opposite the first set and with a repeat of 32 min.

6. The template as defined in claim 1 further comprising an adhesive substrate on the reverse surface.

7. The template as defined in claim 6 further comprising a backing releasably affixed to the adhesive substrate.

8. The template as defined in claim 1 further comprising a first 1.5 mm wide shaded indicia bar traversing the width of the tape at a 22.5 mm distance from the center of one circular indicium to the nearest edge of the first shaded indicia bar in one direction and with a repeat of a multiple of 32 mm for positioning the tape on a first portion of the work surface.

9. The template as defined in claim 1 further comprising a second 1.5 mm wide shaded indicia bar traversing the width of the tape at a 22.5 mm distance from the center of another, colinear, circular indicium to the nearest edge of the second shaded indicia bar in an opposite direction and with a repeat of a multiple of 32 mm for positioning the tape on a second portion of the work surface orthogonal to the first portion the distance between the one circular indicium and the other circular indicium being 32 mm.

10. The template as defined in claim 1 further comprising an indicia line running longitudinally and on center of one set of the circular indicia at a distance of 37 mm from one edge of the tape.

11. The template as defined in claim 1 further comprising a 1.5 mm wide indicia edge line along the entire length of each of the first and second edges for cooperating with the center of the first and second sets of circular indicia respectively.

12. The template as defined in claim 1 further comprising a set of repeating indicia centermarks arranged longitudinally at a distance of 34 mm from the first or the second edge to the center of the indicia centermark and with a repeat of 32 mm.

13. The template as defined in claim 1 further comprising a pair of opposing indicia alignment marks, each mark located at a 37 mm distance from one of the circular indicia and projecting at right angles from the first and second edges.

14. The template as defined in claim 1 further comprising a set of repeating, multiple centerpoint indicia arranged laterally on the obverse surface, the first point located at 17.5 mm from the first or the second edge and additional points indexed on 2 mm increments for locating 35 mm cup hinges and accurately aligning doors with cabinet members.

15. The template as defined in claim 1 further comprising a millimeter scale along the length of the tape.

16. A measuring template tape for defining drill hole locations on a surface and mounting hole locations on an edge of a surface, comprising:

a web having first and second edges and obverse and reverse surfaces;

a plurality of measuring indicia on the obverse surface of the web, the plurality of measuring indicia further comprising;

a first set of circular indicia having a first periodic spacing arranged longitudinally on the obverse surface for locating a hole;

a first indicia bar traversing the width of the tape at a first precise distance from a first circular indicium in one direction and having a second periodic spacing which is an exact multiple of the first periodic spacing for positioning the tape on a first portion of the work surface; and a second indicia bar traversing the width of the tape at the precise distance from a second circular indicium in an opposite direction and having the second periodic spacing for positioning the tape on a second portion of the work surface, the distance between the first indicium and the second indicium being the first periodic spacing.

17. The template according to claim 16, in which the first set of circular indicia is at a second precise distance from the first edge to the center of the first circular indicia.

18. The template according to claim 17, further comprising an indicia line running longitudinally and on center of the first set of circular indicia for visualizing a second precise distance.

19. The template according to claim 16, further comprising an indicia edge line along the first edge.

20. The template according to claim 16, further comprising a set of indicia centermarks arranged longitudinally at a precise distance from the first edge to the center of the first set of circular indicia and having the first periodic spacing.

21. The template according to claim 16, further comprising a pair of opposing indicia alignment marks, each mark located at the second precise distance from one of the circular indicia and projecting at right angles from the first and second edges.

22. The template according to claim 16, further comprising a set of repeating, multiple centerpoint indicia arranged laterally on the obverse surface and additional centerpoints indexed on precise increments.

23. The template according to claim 16, further comprising a scale along the length of the tape.

24. The template according to claim 16, further comprising a line of perforations transverse to the web and penetrating therethrough for separating portions of the web.

25. The template according to claim 16, in which the tape is transparent.

26. The template according to claim 16 in which the distances and scales are metric.

27. The template according to claim 16, further comprising an adhesive substrate on the reverse surface.

28. The template according to claim 27, further comprising a backing layer releasably affixed to the adhesive layer.

29. The template according to claim 28, further comprising centerpoints kiss-cut from the circular indicia so that the center points peel off with the backing to provide for accurate center marking on the work surface.

30. A transparent, metric, template tape for defining drill hole locations on a European style furniture work surface comprising:

a 46.5 mm wide plastic web having first and second edges and obverse and reverse surfaces;

an adhesive substrate on the reverse surface;

a backing releasably affixed to the adhesive layer;

a plurality of measuring indicia on the obverse surface, the indicia being indexed on a metric scale;

the plurality of measuring indicia further comprising;

a first set of repeating circular indicia having a diameter of 8 mm arranged longitudinally at a distance of 37 mm from the first edge to the center of the 8 mm circle and with a repeat of 32 mm;

a second set of repeating circular indicia having a diameter of 5 mm arranged longitudinally at a distance of 37 mm from the second edge to the center of the 5 mm circle opposite the first set and with a repeat of 32 mm;

a first 1.5 mm wide shaded indicia bar traversing the width of the tape at a 22.5 mm distance from the center of one circular indicium to the nearest edge of the first shaded indicia bar in one direction and with a repeat of a multiple of 32 mm for positioning the tape on a first portion of the work surface;

a second 1.5 mm wide shaded indicia bar traversing the width of the tape at a 22.5 mm distance from the center of another, colinear, circular indicium to the nearest edge of the second shaded indicia bar in an opposite direction and with a repeat of a multiple of 32 mm for positioning the tape on a second portion of the work surface orthogonal to the first portion the distance between the one circular indicium and the other circular indicium being 32 mm;

an indicia line running longitudinally and on center of one set of the circular indicia at a distance of 37 mm from one edge of the tape for visualizing the distance;

a 1.5 mm wide indicia band along the entire length of each of the first and second edges for cooperating with the center of the first and second sets of circular indicia respectively;

a set of repeating indicia center marks arranged longitudinally at a distance of 34 mm from one of the first and/or the second edges to the center of the mark and with a repeat of 32 mm;

a pair of opposing indicia alignment marks, each mark located at a 37 mm distance from one of the circular indicia and projecting at right angles from the first and second edges;

a set of repeating, multiple centerpoint indicia arranged laterally on the surface, the first point located at 17.5 mm from the first or the second edge and additional points indexed on 2 mm increments for locating 35 mm cup hinges and accurately aligning doors with cabinet members; and a millimeter scale along the length of the tape.

* * * * *